(12) United States Patent
Sobel et al.

(10) Patent No.: US 7,370,233 B1
(45) Date of Patent: May 6, 2008

(54) VERIFICATION OF DESIRED END-STATE USING A VIRTUAL MACHINE ENVIRONMENT

(75) Inventors: William E. Sobel, Stevenson Ranch, CA (US); Bruce McCorkendale, Manhattan Beach, CA (US)

(73) Assignee: Symantec Corporation, Cupertino, CA (US)

( * ) Notice: Subject to any disclaimer, the term of this patent is extended or adjusted under 35 U.S.C. 154(b) by 698 days.

(21) Appl. No.: 10/852,773

(22) Filed: May 21, 2004

(51) Int. Cl.
*G06F 11/00* (2006.01)

(52) U.S. Cl. .............................. 714/15; 714/38; 714/41; 726/22; 717/128

(58) Field of Classification Search .................. 714/15, 714/38, 41; 726/22; 717/128
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,502,815 A * | 3/1996 | Cozza | ......................... 714/38 |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,067,410 A * | 5/2000 | Nachenberg | ................. 703/28 |
| 6,070,244 A | 5/2000 | Orchier et al. | |
| 6,072,830 A | 6/2000 | Proctor et al. | |
| 6,088,803 A | 7/2000 | Tso et al. | |

(Continued)

FOREIGN PATENT DOCUMENTS

DE     100 21 686 A1    11/2001

(Continued)

OTHER PUBLICATIONS

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36, Sep. 4, 1992, pp. 44-47.

(Continued)

*Primary Examiner*—Emerson Puente
(74) *Attorney, Agent, or Firm*—Fenwick & West LLP

(57) ABSTRACT

An integrity verification manager (101) verifies the integrity of a backup (102) of a computer (103). The integrity verification manager (101) audits the computer (103), and stores information (107) concerning items of interest such as executing processes (109, 111) and open listening ports (113). The integrity verification manager (101) restores a backup (102) of the computer (103) to a virtual machine environment. The integrity verification manager (101) audits the restoration of the backup (102) in the virtual machine environment, and compares audit information (107) concerning the restoration to the stored audit information (107). Responsive to the results of the comparison, the integrity verification manager (101) determines whether the restoration succeeded or failed.

20 Claims, 2 Drawing Sheets

U.S. PATENT DOCUMENTS

| | | |
|---|---|---|
| 6,094,731 A | 7/2000 | Waldin et al. |
| 6,104,872 A | 8/2000 | Kubota et al. |
| 6,108,799 A | 8/2000 | Boulay et al. |
| 6,167,434 A | 12/2000 | Pang |
| 6,192,379 B1 | 2/2001 | Bekenn |
| 6,199,181 B1 | 3/2001 | Rechef et al. |
| 6,275,938 B1 | 8/2001 | Bond et al. |
| 6,338,141 B1 | 1/2002 | Wells |
| 6,357,008 B1 | 3/2002 | Nachenberg |
| 6,370,648 B1 | 4/2002 | Diep |
| 6,493,007 B1 | 12/2002 | Pang |
| 6,535,891 B1 | 3/2003 | Fisher et al. |
| 6,552,814 B2 | 4/2003 | Okimoto et al. |
| 6,611,925 B1 | 8/2003 | Spear |
| 6,622,150 B1 | 9/2003 | Kouznetsov et al. |
| 6,651,191 B1 * | 11/2003 | Vacante et al. ............... 714/47 |
| 6,678,734 B1 | 1/2004 | Haatainen et al. |
| 6,697,950 B1 | 2/2004 | Ko |
| 6,721,721 B1 | 4/2004 | Bates et al. |
| 6,748,534 B1 | 6/2004 | Gryaznov et al. |
| 6,763,462 B1 | 7/2004 | Marsh |
| 6,813,712 B1 | 11/2004 | Luke |
| 6,851,057 B1 | 2/2005 | Nachenberg |
| 6,910,134 B1 | 6/2005 | Maher et al. |
| 7,024,581 B1 * | 4/2006 | Wang et al. .................... 714/2 |
| 7,107,366 B2 * | 9/2006 | Cheng et al. ................. 710/36 |
| 7,152,164 B1 * | 12/2006 | Loukas ....................... 713/188 |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2003/0023865 A1 | 1/2003 | Cowie et al. |
| 2003/0051026 A1 | 3/2003 | Carter et al. |
| 2003/0065926 A1 | 3/2003 | Schultz et al. |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0140049 A1 | 7/2003 | Radatti |
| 2003/0191966 A1 | 10/2003 | Gleichauf |
| 2003/0212902 A1 | 11/2003 | van der Made |
| 2003/0212906 A1 * | 11/2003 | Arnold et al. ............... 713/201 |
| 2003/0236995 A1 | 12/2003 | Fretwell, Jr. |
| 2004/0010787 A1 * | 1/2004 | Traut et al. .................... 718/1 |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2004/0162808 A1 | 8/2004 | Margolus et al. |
| 2004/0172574 A1 * | 9/2004 | Wing et al. .................... 714/4 |
| 2004/0181687 A1 | 9/2004 | Nachenberg et al. |
| 2005/0021740 A1 | 1/2005 | Bar et al. |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2006/0064755 A1 | 3/2006 | Azadet et al. |

FOREIGN PATENT DOCUMENTS

| | | |
|---|---|---|
| EP | 1 280 039 A | 1/2003 |
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Toth, et al "Connection-history based anomaly detection" Proceedings of the 2002 IEEE Workshop on Information Assurance and Security. West Point, NY, Jun. 17-19, 2002, pp. 30-35.

Kephart, Jeffrey et al., "An Immune System for Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

\* cited by examiner

VERIFICATION OF DESIRED END-STATE USING A VIRTUAL MACHINE ENVIRONMENT

TECHNICAL FIELD

This invention pertains generally to verifying the desired end-state of a computer after a restore or software deployment operation, and more specifically to doing so using a virtual machine environment.

BACKGROUND ART

Some of the most important and logistically difficult issues for IT staff are disaster recovery, patch management and software distribution. Best practices call for frequent backups of computers, and for frequent application of patches to keep machines secure and current.

Critical machines have to be available at all times. In addition, there can be hundreds of thousands of desktop machines to be managed by a single IT department, and problems with patch or software distribution to just a few percent of those machines can cost a company large sums of money in the form of support and remediation.

In the event of the failure of a critical machine, a restore from backup is often the only means of recovery. Unfortunately, the restore from a given backup sometimes fails. What is needed are methods, computer readable media and systems that ensure reliable and convenient verification that a given backup will properly restore the image of a computer, without having to put the computer at risk in order to perform such a test.

Application of a patch can sometimes cause a machine to stop functioning properly; a condition that cannot be tolerated in the case of a critical computer. On the other hand, not patching a machine can leave it vulnerable to attack, or to failure due to a bug that the patch is designed to fix. Unfortunately, this state of affairs puts 15, the IT administrator in the awkward position of having to weigh the cost of patching (with the possibility of causing the machine to fail) with the cost of not patching (with the possibility of attack and/or system failure). What is further needed are methods, computer readable media and systems that can reliably and conveniently verify that a given patch will not destabilize or otherwise disable a computer, without having to put the machine at risk in order to perform such a test.

Software distribution that involves targeting various classes of desktop machines throughout a large enterprise poses problems similar to those already described for backup restoration and patch application. A system which targets certain sets of software to different sets of machine types adds even more complexity to the problem. The administrator wants to verify that a particular software distribution job will result in the proper software being installed on the target set of computers. Furthermore, the administrator needs assurance that the software does not cause incompatibility or other problems once installed on the proper set of machines. All of this should preferably be accomplished prior to the rollout of the installation job. Therefore, what is also needed are methods, computer readable media and systems that can reliably and conveniently verify that a given software distribution job will successfully install the desired software on the desired machines, without causing failure thereof, prior to administrating the distribution.

DISCLOSURE OF INVENTION

Some embodiments of the present invention comprise methods, systems, and computer readable media for verifying the integrity of a backup (102) of a computer (103). An integrity verification manager (101) audits the computer (103), and stores information (107) concerning items of interest such as executing processes (109, 111) and open listening ports (113). The integrity verification manager (101) restores a backup (102) of the computer (103) to a virtual machine environment. The integrity verification manager (101) audits the restoration of the backup (102) in the virtual machine environment, and compares audit information (107) concerning the restoration to the stored audit information (107). Responsive to the results of the comparison, the integrity verification manager (101) determines whether the restoration succeeded or failed.

In other embodiments, the integrity verification manager (101) verifies the integrity of a software modification (201) to a computer (103). The integrity verification manager (101) audits the computer (103) and stores information (107) concerning items of interest. The integrity verification manager (101) then applies the software modification (201) to an image (105) concerning the computer (103) in a virtual machine environment. The integrity verification manager (101) audits the image (105) in the virtual machine environment, and compares the resulting audit information (107) to the stored audit information (107). Responsive to the results of the comparison, the integrity verification manager (101) determines whether the deployment of the modification (201) succeeded or failed.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
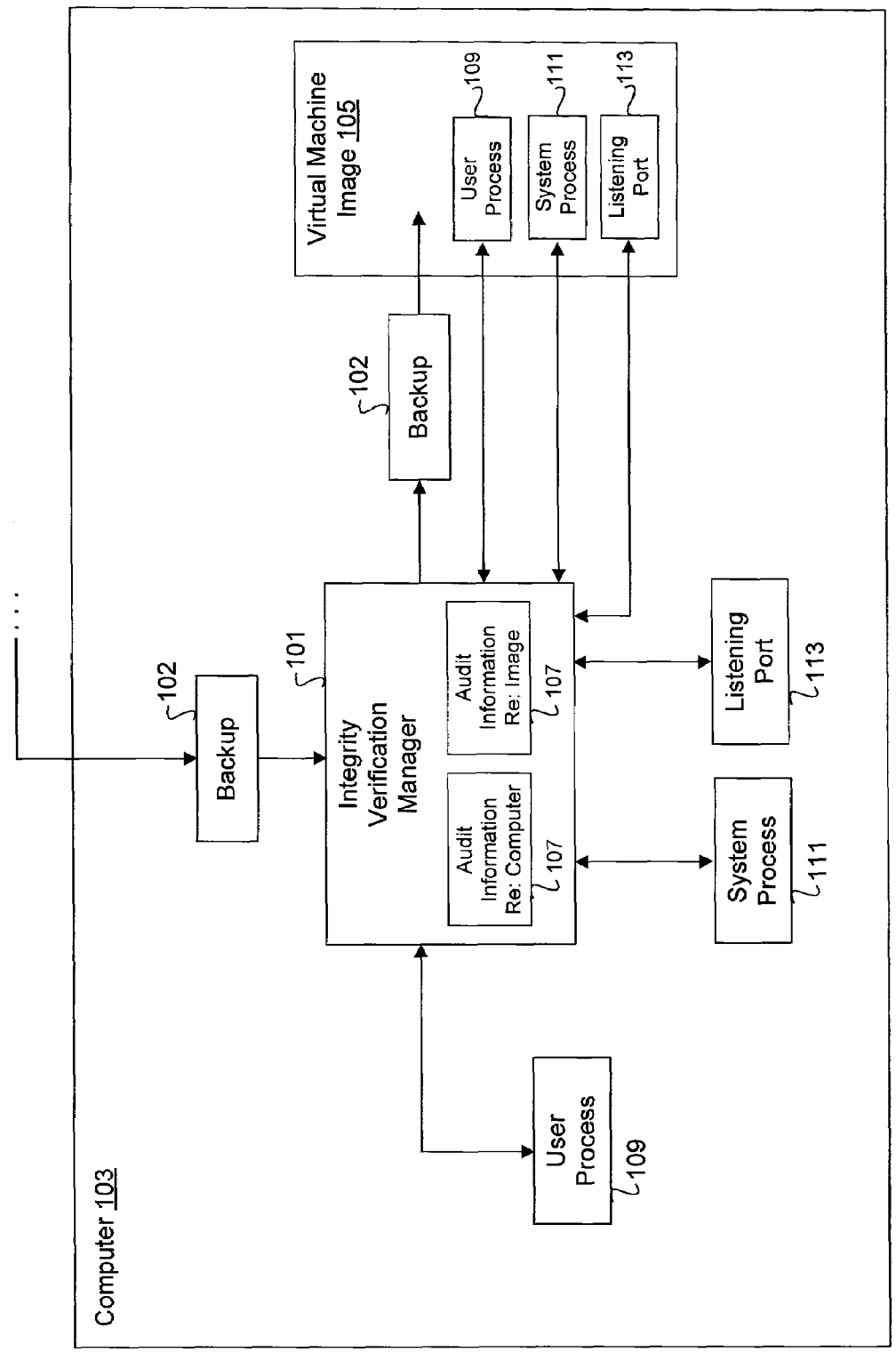
FIG. 1 is a block diagram illustrating a high level overview of a system for practicing some embodiments of the present invention, in which the integrity verification manager verifies the integrity of the restoration of a backup of a computer.

FIG. 1 illustrates a high level overview of a system 100 for performing some embodiments of the present invention. An integrity verification manager 101 runs in a computer 103. It is to be understood that although the integrity verification manager 101 is illustrated as a single entity, as the term is used herein an integrity verification manager 101 refers to a collection of functionalities which can be implemented as software, hardware, firmware or any combination of the three. Where an integrity verification manager 101 is implemented as software, it can be implemented as a standalone program, but can also be implemented in other ways, for example as part of a larger program, as a plurality of separate programs, or as one or more statically or dynamically linked libraries.

Generally, the integrity verification manager 101 models and then verifies the desired state that should result from processes such as restoration of a backup 102, application of a software patch, distribution of a software application, etc. For safety, such processes are applied to a virtual machine version 105 (model) of the computer 103, and then a verification process is run against the result in the virtual machine image 105 before "live" deployment of the desired process.

In the case of backup 102 restoration, a computer 103 that has just been backed up can serve as a model for the desired end state of a restoration of that backup 102. Thus, as illustrated in FIG. 1, in some embodiments of the present invention, the integrity verification manager 101 audits the computer 103 (either immediately after it has been backed-up, or at some other point after the backup 102 has been performed) to determine which items of interest are present thereon. The items of interest can be any items that are present prior on the computer 103 prior to the restore from the backup 102, and which are expected to be present thereafter. In some embodiments of the present invention, a system administrator or the like can specify which items are expected to be present after a restoration. If one or more items are not present after the restoration, it is an indication that the restoration was not successful. Which items are specifically audited is a design choice, and can include, for example, some or all executing user processes 109, some or all executing system processes 111 and/or some or all open listening ports 113. Other examples of possible items of interest will be apparent to those of ordinary skill in the relevant art in light of this specification.

After auditing the computer 103, the integrity verification manager 101 stores audit information 115 (e.g., a list of which items of interest are present). When it is desired to restore the computer 103 from the backup image 102, in order to ensure that the restoration will succeed, the integrity verification manager 101 restores the backup 102 of the computer 103 to the virtual machine environment 105. The resulting end state of the virtual machine 105 can then be verified through comparison with the stored audit information 107 concerning the computer 103.

More specifically, the integrity verification manager 101 audits the restored image 105 of the computer 103 in the virtual environment, and compares audit information 107 concerning the restored image 105 to the stored audit information 107 concerning the backed-up computer 103, to determine whether any items of interest are missing.

In some embodiments, responsive to the comparison revealing that at least one item from the initial audit is not present in the restored backup 102, the integrity verification manager 101 determines that the restoration failed. Responsive to the comparison revealing that all items from the initial audit are present in the restored backup 102, the integrity verification manager 101 determines that the restoration succeeded. In such a case, the restoration can then be applied to the computer 103 itself.

Because it can take time for items of interest (e.g., running programs) to be reconfigured and/or reactivated (e.g., reloaded) on a computer 103 after restoration of a backup 102, in some embodiments of the present invention, the integrity verification manager 101 waits for a specified period of time before auditing the virtual machine image 105, and then comparing 309 the corresponding audit information 107 to the stored audit information 107 concerning the computer 103. The amount of time to wait is a design choice, and can vary from embodiment to embodiment as desired.

In other embodiments, the integrity verification manager 101 repeats the steps of auditing the virtual machine image 105 and comparing 309 the corresponding audit information 107 to the stored audit information 107 a specific number of times at specified time intervals, to ensure that all items of interest remain running properly under various circumstances. The number of times to repeat the audit and comparison, as well as the interval(s) at which to repeat them, are design choices that can vary from embodiment to embodiment, and can, for example, be specified by an administrator or the like on a default or per restoration basis.

Note that the invention is independent of the backup method employed. Various backup techniques that can be restored on a raw system are known in the art, and the present invention can be utilized in conjunction with any of them. For example, there is known to those of ordinary skill in the relevant art technology to allow restoration of an image 105 made for one computer 103 to work when restored to another computer 103. Also known to those of ordinary skill in the relevant art technology is technology for creating a virtual machine image 105 from a physical computer 103. Such technology can be employed to allow the restore process to work when applied in a virtual machine environment, in a manner that will be readily apparent to one of ordinary skill in the relevant art in light of this specification.

Figure 2:
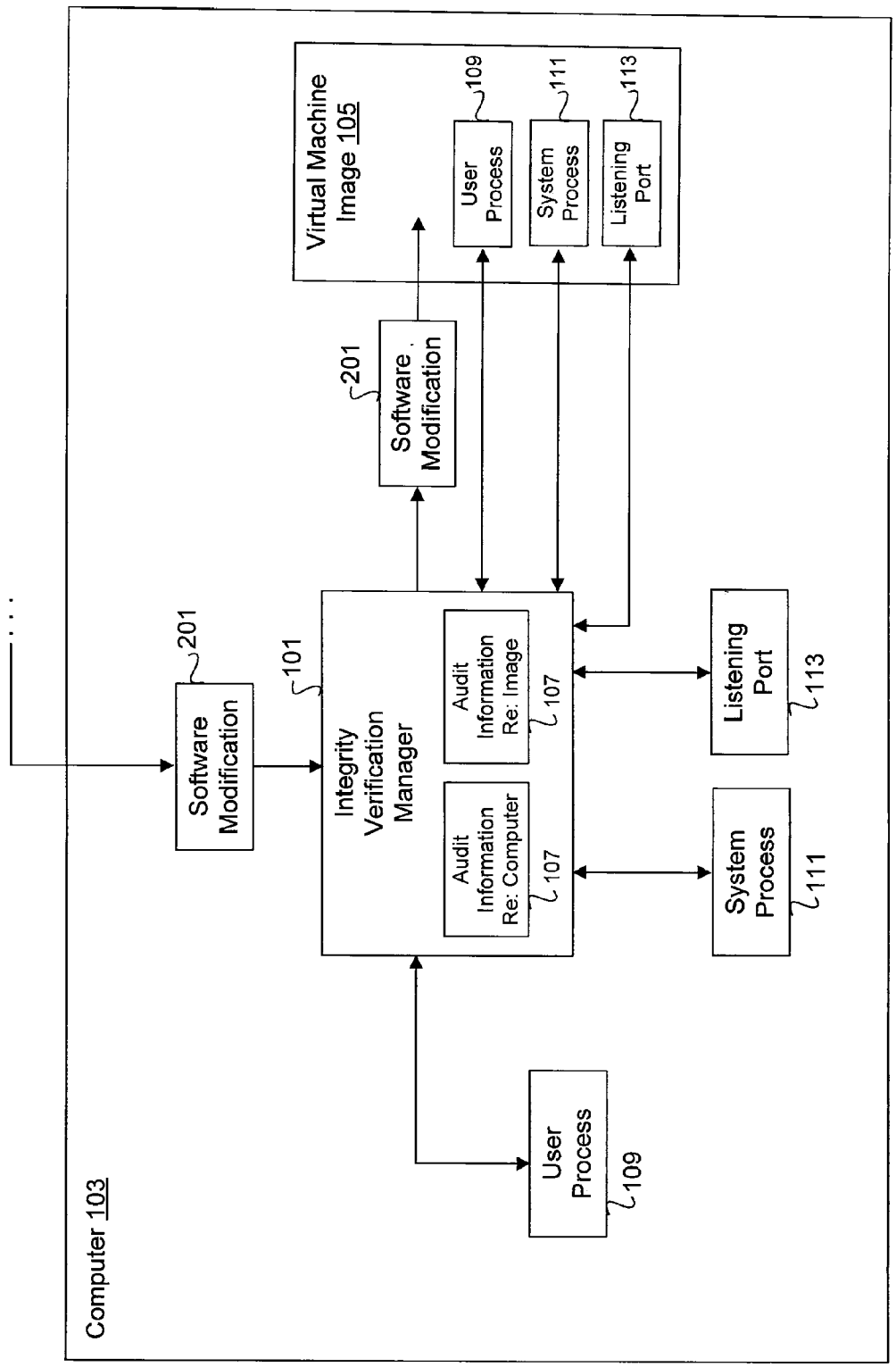
FIG. 2 is a block diagram illustrating a high level overview of a system for practicing other embodiments of the present invention, in which the integrity verification manager verifies the integrity of the deployment of a software modification to a computer.

Turning now to FIG. 2, in some embodiments of the present invention, the integrity verification manager 101 verifies the integrity of a computer 103 after the application of a software modification 201, such as a software patch or the installation or upgrade of a software program.

In such embodiments the integrity verification manager 101 uses the state of the computer 103 prior to the application of the software modification 201 as its model for verification after the deployment of the modification 201. As such, prior to the deployment of a modification 201, the integrity verification manager 101 audits the computer 103, and stores associated audit information 107, as described above in conjunction with FIG. 1.

In order to verify the integrity of the computer 103 after the deployment, the integrity verification manager 101 creates or uses a virtual computer image 105 representing a reasonable approximation of the computer's 103 pre-deployment state, into which to apply the modification 201. In some embodiments, the integrity verification manager 101 creates a virtual machine image 105 of the specific computer 103 and uses that image 105.

However, in some computing environments, there can be hundreds of thousands of computers within an enterprise. Thus, in some embodiments, representative samples of these computers 103 are used to create virtual machine images 105. A typical managed enterprise environment has definite classes of computers 103 such that the set for each class should be well known. For example, in various embodiments, images 105 are created and stored for each operating system platform known to be in the enterprise environment, for each major revision of an operating system known to be in the enterprise environment and/or for each specific major hardware and/or software configuration in the enterprise environment. Furthermore, in some embodiments images 105 of specific, critical computers 103 are created and stored, or images 105 created for verification of a backup operation are stored for future use.

Thus, in some embodiments the integrity verification manager 101 creates a virtual machine image 105 to use for verification purposes, whereas in other embodiments the integrity verification manager 101 uses an existing, stored image 105. The implementation mechanics of creating and storing images 105 of computers 103 are known to those of ordinary skill in the relevant art.

In order to verify the integrity of the deployment of a software modification 201, the integrity verification manager 101 applies the modification 201 to the virtual machine image 105 concerning the computer 103. Because the deployment might have affected one or more items of interest, the integrity verification manager 101 audits the virtual machine image 105 and compares the resulting audit information 107 to the stored audit information 107 concerning the computer 103 in its pre-modification 201 state to determine whether any items of interest are missing.

In some embodiments, responsive to the comparison revealing that at least one item from the initial audit is no longer present on the computer 103, the integrity verification manager 101 determines that the software modification 201 failed. Responsive to the comparison revealing that all items from the initial audit are present in the restored backup 102, the integrity verification manager 101 determines that the modification 201 succeeded. The modification 201 can then be deployed to the computer 103.

Because it can take time for items of interest (e.g., running programs) to be reconfigured and/or reactivated (e.g., reloaded) on a computer 103 after a modification 201 deployment, in some embodiments of the present invention, the integrity verification manager 101 waits for a specified period of time before auditing the virtual machine image 105 and comparing the resulting audit information 107 to the stored audit information 107 concerning the computer 103. In other embodiments, the integrity verification manager 101 repeats the steps of auditing the image 105 and comparing 309 the resulting audit information 107 to the stored audit information 107 a specific number of times at specified time intervals, to ensure that all items of interest remain running properly under various circumstances.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for verifying the integrity of a backup of a computer, the method comprising the steps of:
   an integrity verification manager auditing the computer and storing computer audit information identifying at least one item from a group of items consisting of:
   at least one currently executing system process;
   at least one currently executing user process; and
   at least one currently open listening port;
   the integrity verification manager restoring the backup of the computer to a virtual machine environment;
   the integrity verification manager auditing the restoration of the backup in the virtual machine environment and determining if the at least one identified item from the stored computer audit information is present in the restoration;
   the integrity verification manager performing a step from a group of steps consisting of:
   responsive to determining that at least one item from the stored computer audit information is not present in the restoration, the integrity verification manager determining that the restoration failed; and
   responsive to determining that all items from the stored computer audit information are present in the restoration, the integrity verification manager determining that the restoration succeeded.

2. The method of claim 1 further comprising:
   the integrity verification manager waiting for a specified period of time before auditing the restoration of the backup in the virtual machine environment, and determining if the at least one identified item from the stored computer audit information is present in the restoration, wherein the specified period of time is based on an expected time period for the at least one identified item to become active after restoring the backup.

3. The method of claim 1 further comprising:
   the integrity verification manager repeating the following steps a specified number of times at specified intervals:
   auditing the restoration in the virtual machine environment and determining if the at least one identified item from the stored computer audit information is present in the restoration.

4. A computer implemented method for verifying the integrity of a software modification to a computer, the method comprising the steps of:
   an integrity verification manager auditing the computer and storing computer audit information identifying at least one item from a group of items consisting of:
   at least one currently executing system process;
   at least one currently executing user process; and
   at least one currently open listening port;
   the integrity verification manager applying the software modification to an image concerning the computer in a virtual machine environment;
   the integrity verification manager auditing the image concerning the computer in the virtual machine environment and determining if the at least one identified item from the stored computer audit information is present in the image concerning the computer in the virtual machine environment;
   and the integrity verification manager performing a step from a group of steps consisting of:
   responsive to determining that at least one item from the stored computer audit information is not present in the image, the integrity verification manager determining that the software modification failed; and responsive to determining that all items from the stored computer audit information are present in the image, the integrity verification manager determining that the software modification succeeded.

5. The method of claim 4 wherein:
applying the software modification comprises installing a software package from a group of software packages consisting of:
a patch;
a new software package; and
an updated version of an existing software package.

6. The method of claim 4 further comprising the steps of:
the integrity verification manager creating the image concerning the computer in the virtual machine environment, based on the computer itself.

7. The method of claim 4 further comprising the step of:
the integrity verification manager using an existing virtual machine image as the image concerning the computer.

8. The method of claim 7 wherein:
the existing image is one from a group of images consisting of:
an image concerning computers running a specific operating system;
an image concerning computers running a specific version of a specific operating system;
an image concerning computers with a specific configuration; and
an image concerning a latest backup of the computer.

9. The method of claim 4 further comprising:
the integrity verification manager waiting for a specified period of time before auditing the image concerning the computer in the virtual machine environment, and determining if the at least one identified item from the stored computer audit information is present in the image concerning the computer in the virtual machine environment, wherein the specified period of time is based on an expected time period for the at least one identified item to become active after applying the software modification.

10. The method of claim 4 further comprising:
the integrity verification manager repeating the following steps a specified number of times at specified intervals:
auditing the image concerning the computer in the virtual machine environment and determining if the at least one identified item from the stored computer audit information is present in the image concerning the computer in the virtual machine environment.

11. A computer readable storage medium containing a computer program product for verifying the integrity of a backup of a computer, the computer program product comprising:
program code for auditing the computer and storing computer audit information identifying at least one item from a group of items consisting of:
at least one currently executing system process;
at least one currently executing user process; and
at least one currently open listening port;
program code for restoring the backup of the computer to a virtual machine environment;
program code for auditing the restoration of the backup in the virtual machine environment and determining if the at least one identified item from the stored computer audit information is present in the restoration;
and program code for performing a step from a group of steps consisting of:
responsive to determining that at least one item from the stored computer audit information is not present in the restoration, determining that the restoration failed; and
responsive to determining that all items from the stored computer audit information are present in the restoration, determining that the restoration succeeded.

12. A computer readable storage medium containing a computer program product for verifying the integrity of a software modification to a computer, the computer program product comprising:
program code for auditing the computer and storing computer audit information identifying at least one item from a group of items consisting of:
at least one currently executing system process;
at least one currently executing user process; and
at least one currently open listening port;
program code for applying the software modification to an image concerning the computer in a virtual machine environment;
program code for auditing the image concerning the computer in the virtual machine environment and determining if the at least one identified item from the stored computer audit information is present in the image concerning the computer in the virtual machine environment;
and program code for performing a step from a group of steps consisting of:
responsive to determining that at least one item from the stored computer audit information is not present in the image, determining that the software modification failed; and
responsive to determining that all items from the stored computer audit information are present in the image, determining that the software modification succeeded.

13. The computer program product of claim 12 further comprising:
program code for creating the image concerning the computer in the virtual machine environment, based on the computer itself.

14. The computer program product of claim 12 further comprising:
program code for using an existing virtual machine image as the image concerning the computer.

15. The computer program product of claim 14 wherein:
the existing image is one from a group of images consisting of:
an image concerning computers running a specific operating system;
an image concerning computers running a specific version of a specific operating system;
an image concerning computers with a specific configuration; and
an image concerning a latest backup of the computer.

16. The computer program product of claim 12, wherein:
program code for applying the software modification comprises program code for installing a software package from a group of software packages consisting of:
a patch;
a new software package; and
an updated version of an existing software package.

17. The computer program product of claim 12, further comprising:

program code for waiting for a specified period of time before auditing the image concerning the computer in the virtual machine environment, and determining if the at least one identified item from the stored computer audit information is present in the image concerning the computer in the virtual machine environment, wherein the specified period of time is based on an expected time period for the at least one identified item to become active after applying the software modification.

18. The computer program product of claim 12, further comprising:
program code for repeating the following steps a specified number of times at specified intervals:
auditing the image concerning the computer in the virtual machine environment and determining if the at least one identified item from the stored computer audit information is present in the image concerning the computer in the virtual machine environment.

19. A computer system for verifying the integrity of a backup of a computer, the computer system comprising:
a processor; and
a computer readable storage medium for storing instructions executable by the processor, the instructions when executed cause the processor to:
audit the computer and store computer audit information identifying at least one item from a group of items consisting of:
at least one currently executing system process;
at least one currently executing user process; and
at least one currently open listening port;
restore the backup of the computer to a virtual machine environment;
audit the restoration of the backup in the virtual machine environment and determine if the at least one identified item from the stored computer audit information is present in the restoration;
and perform a step from a group of steps consisting of:
responsive to determining that at least one item from the stored computer audit information is not present in the restoration, determining that the restoration failed; and
responsive to determining that all items from the stored computer audit information are present in the restoration, determining that the restoration succeeded.

20. A computer system for verifying the integrity of a software modification to a computer, the computer system comprising:
a processor; and
a computer readable storage medium for storing instructions executable by the processor, the instructions when executed cause the processor to:
audit the computer and store computer audit information concerning at least one item from a group of items consisting of:
at least one currently executing system process;
at least one currently executing user process; and
at least one currently open listening port;
apply the software modification to an image concerning the computer in a virtual machine environment;
audit the image concerning the computer in the virtual machine environment and determine if the at least one identified item from the stored computer audit information is present in the image concerning the computer in the virtual machine environment; and
perform a step from a group of steps consisting of:
responsive to determining that at least one item from the stored computer audit information is not present in the image, determining that the software modification failed; and
responsive to determining that all items from the stored computer audit information are present in the image, determining that the software modification succeeded.

* * * * *